United States Patent

Erekson et al.

[15] 3,696,847
[45] Oct. 10, 1972

[54] APPLE SLICER AND CELLER

[72] Inventors: Arthur B. Erekson, Scarsdale, N.Y.; Malcolm S. Lane, Baltimore, Md.

[73] Assignee: Borden Inc., New York, N.Y.

[22] Filed: June 15, 1970

[21] Appl. No.: 46,222

[52] U.S. Cl.................................................146/42
[51] Int. Cl.................................................A23n 3/08
[58] Field of Search.....146/33, 40, 52, 241, 224, 238

[56] References Cited

UNITED STATES PATENTS 3,351,114   11/1967   Anderson................146/52 X

*Primary Examiner*—Willie G. Abercrombie
*Attorney*—G. P. Maskas, Edward Mandell and George A. Kap

[57] ABSTRACT

The apparatus includes a cluster of knife blades which is moved up and down to slice the fruit; a free floating cylinder having axial slots and freely resting on the cluster, the cluster being disposed within the free floating member with its blades being positioned within the slots; an apertured cup holding a cored fruit positioned below the cluster, the core passage of the fruit being aligned with the aperture in the cup; and a celling knife disposed below the cup which is raised into the core passage in the fruit to remove the seed cell material thereupon. The sequence of operation is commenced by positioning the fruit in the cup below the cluster and above the celling knife. The free floating member is brought to rest on the fruit while the celling knife is raised into the core passage in the fruit, gradually expanded to remove the seed cell material therefrom in small particles, collapsed and retracted from the core passage. The cluster of knife blades is advanced against the fruit to slice same and retracted while the free floating member, being restrained by the flexible stop member, extracts wedged slices of the fruit from between the knife blades.

14 Claims, 13 Drawing Figures 3,696,847

INVENTORS
ARTHUR B. EREKSON
MALCOLM S. LANE
BY
ATTORNEY

PATENTED OCT 10 1972 3,696,847
SHEET 2 OF 4
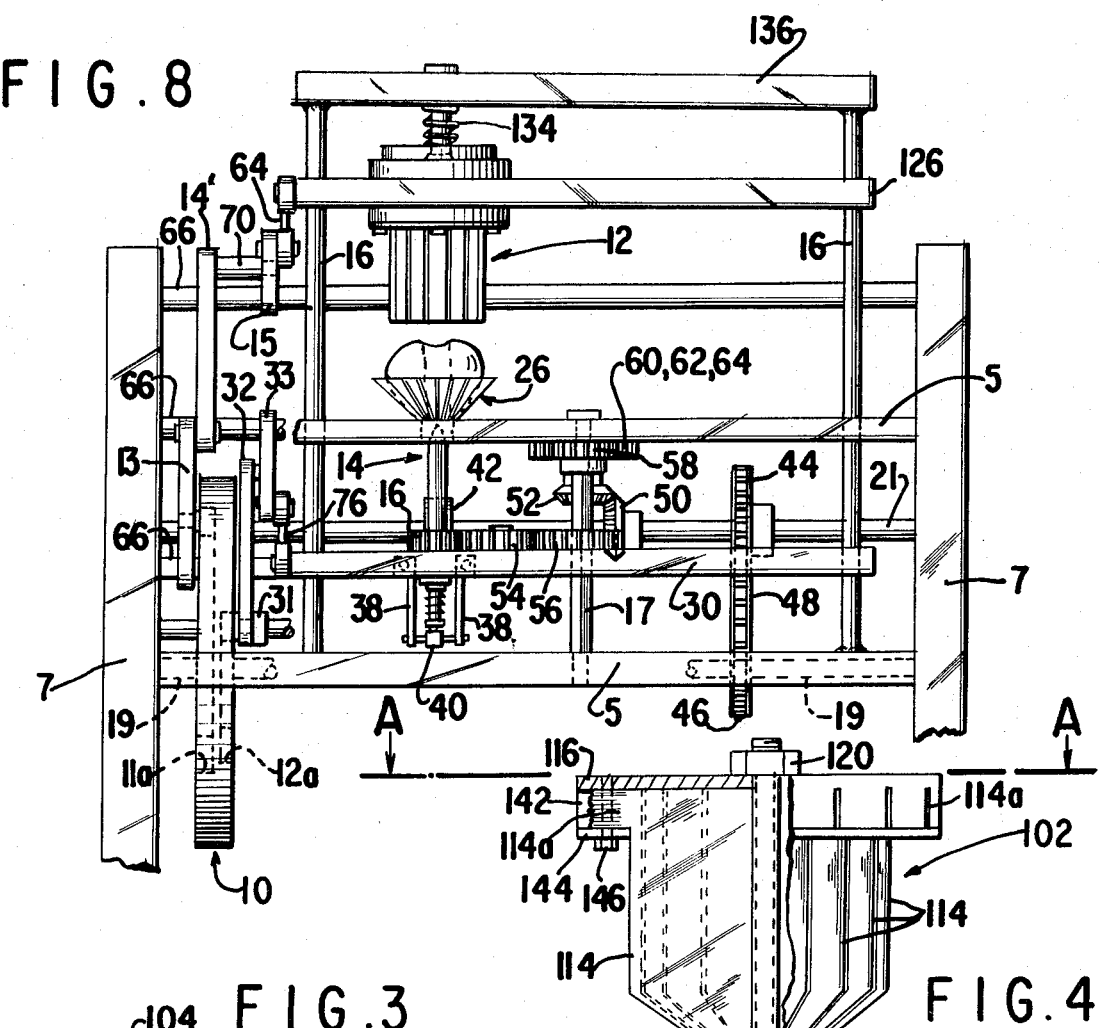
FIG. 8
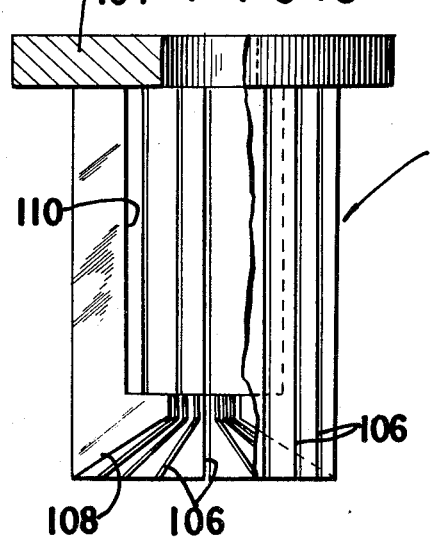
FIG. 3
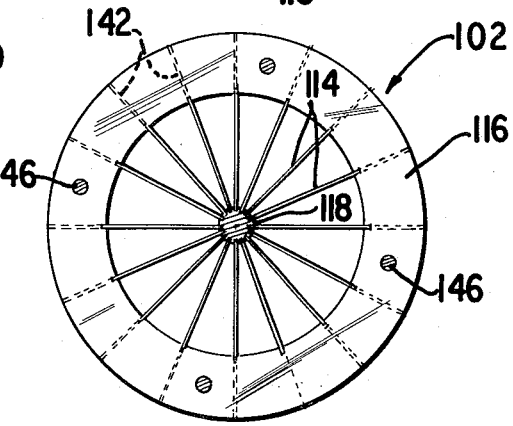
FIG. 4
FIG. 5
INVENTORS
ARTHUR B. EREKSON
BY MALCOLM S. LANE
ATTORNEY

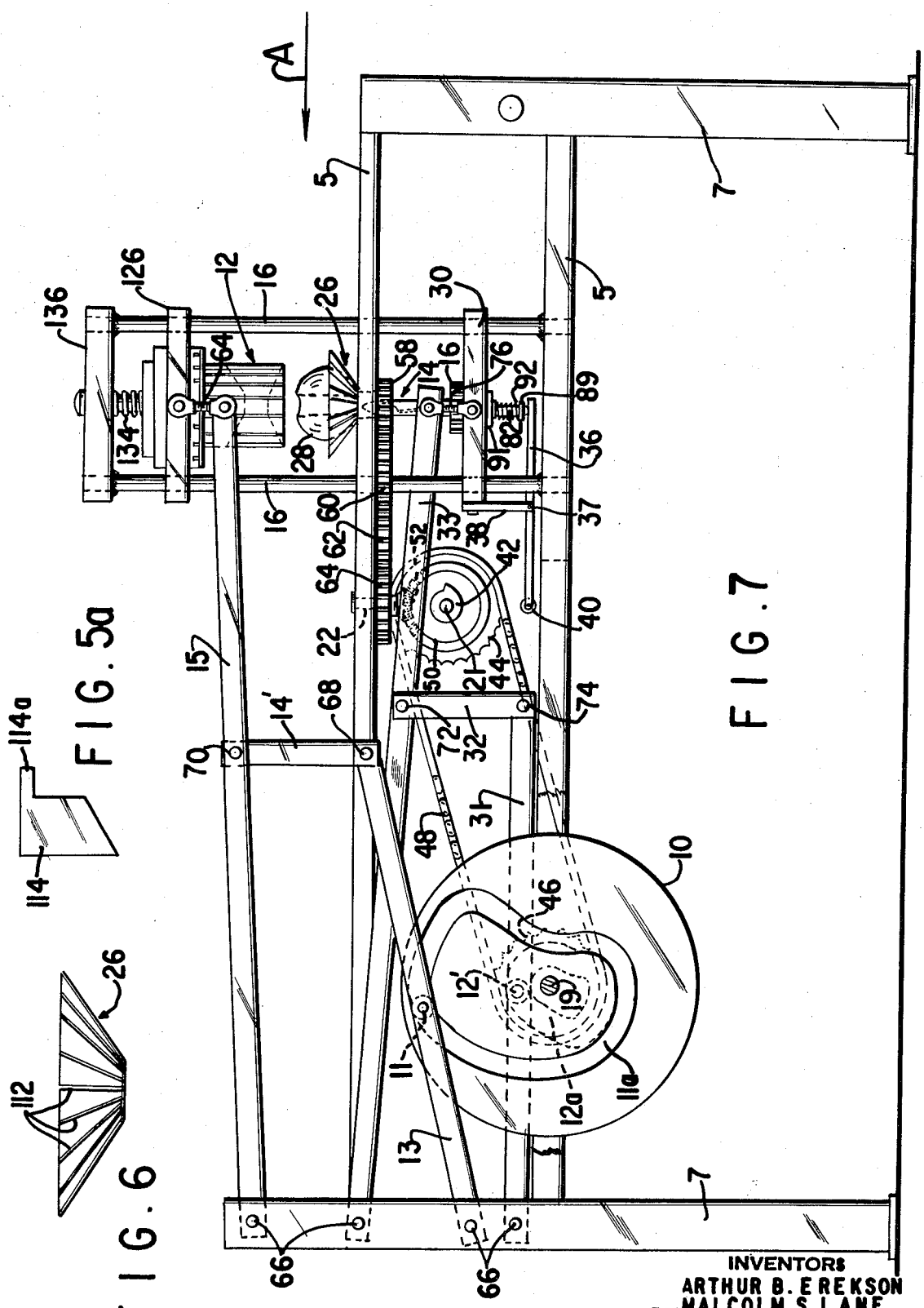

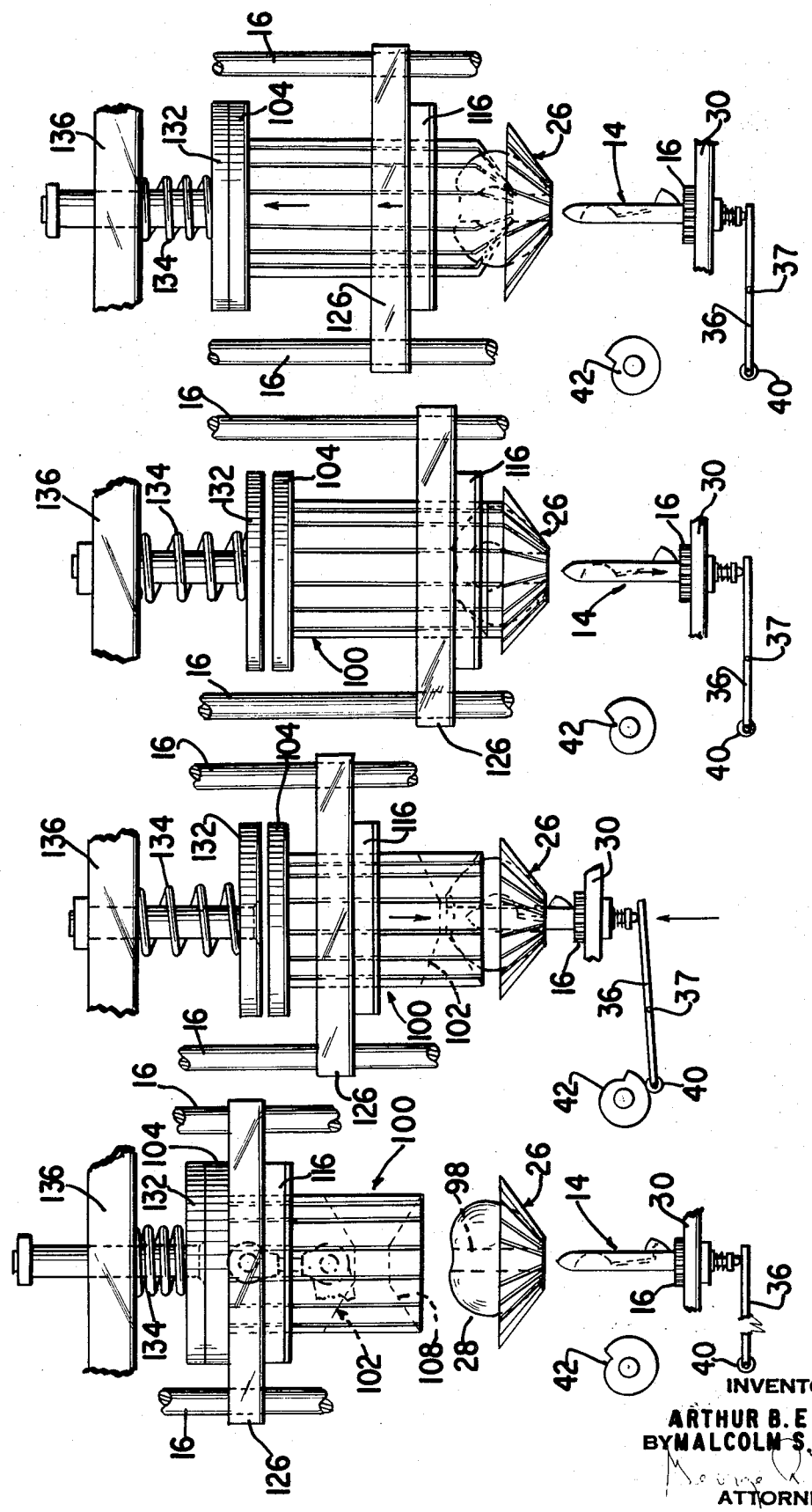

APPLE SLICER AND CELLER

This invention relates to celling and slicing fruit, such as apples, and to a machine therefor. The machine includes a plurality of centrally apertured cups mounted in a conveyor belt fashion, a slicer assembly disposed above the cups and an expandable celling knife disposed below the cups in axial alignment with the slicer assembly. When a cup is conveyed to a position directly under the slicer assembly, the apple in the cup, which had been previously cored, is oriented so that the cylindrical passage through the apple is vertically extended and aligned with the central aperture in the cup. A free floating weight, which constitutes a part of the slicer assembly, is set on the apple to hold the apple in position. The rotating celling knife is raised into the cylindrical passage in the apple and is gradually expanded to remove the seed cell material in sufficiently fine fragments to be screened out by conventional process for discarding undesirable small pieces of apples. When the celling operation has been completed, the celling knife is retracted and the slicer knife cluster, which is a part of the slicer assembly, is brought down on the apple to slice it into a plurality of pieces. The celling and slicing operation is completed upon raising of the slicer assembly. By virtue of the cooperation between the slicer knife cluster and the free floating weight, the sliced apple remains in the cup when the slicer assembly is elevated.

The invention described herein overcomes insufficiencies of the prior art machines. With the previously known machines, fruit breakage occurred during transfer of the fruit to the slicing machine. The fruit would break in such small pieces that it was lost. The fruit was also at times split when it was held in position for celling with the result that no celling was effected and when it was canned, the product was thereby down-graded. The other major shortcoming of the prior art machines was due to the fact that the fruit had to be positioned for celling by hand. This was, of course, a significant detriment to the automatic operation of the machine.

For a more complete description of the novel celling and slicer machine, reference is hereby made to the drawings wherein:

FIG. 3 is a cross-sectional view of the free floating weight;

FIG. 4 is a front elevational view of the slicer knife cluster;

FIG. 5 is a view of the slicer knife cluster through plane A—A in FIG. 4;

FIG. 5A shows a knife blade of the slicer knife cluster;

FIG. 6 shows a cross-sectional view of the orienting cup with grooves to accommodate the blades of the slicer knife cluster;

FIG. 7 is a side elevational view of the preferred embodiment of the machine;

FIG. 8 is a front view of the machine illustrated in FIG. 7, as viewed in the direction of the arrow A;

FIGS. 9, 10, 11 and 12 illustrate schematically the operational sequence of the celling and slicing machine.

Figure 1:
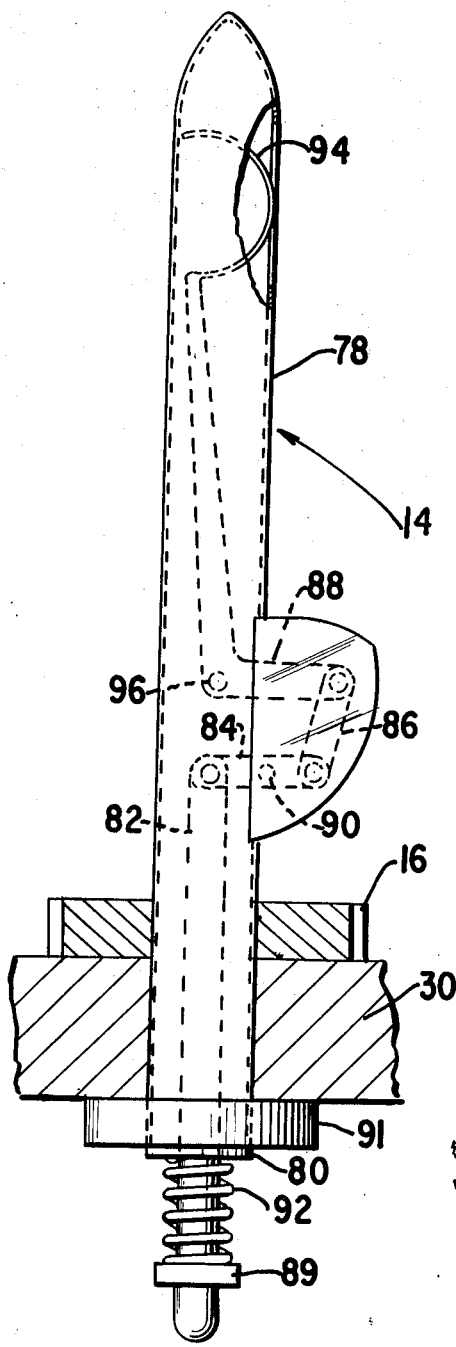
FIG. 1 is an enlarged view of the celling knife illustrating details of the construction.

Before proceeding with the description of the apple celling and slicing machine, a description of the celling knife and the slicer knife assembly will be presented. The celling knife is illustrated by FIG. 1, and the slicer assembly by FIGS. 2, 3, 4 and 5. In this fashion, since a better understanding of the components of the machine will be had, later description of the machine itself should facilitate comprehension thereof.

FIG. 1 illustrates the celling knife 14 which includes sheath 78 of cylindrical construction terminating in a conical section. The lower end of sheath 78 is defined by a centrally apertured plate 80 through which, arm 82 projects into the interior. L-shaped link 88 is pivotally connected to link 84 through link 86 and link 84 is pivotally connected to link 82. Bow-shaped celling knife 94 is affixed to the L-shaped link 88. In the inoperative or collapsed position, celling knife 94 is maintained within the sheath by means of biased spring 92 which is disposed between collars 89 and 91 on the arm 82. A gear 16 is fastened to sheath 78 and imparts rotation thereto from a drive gear through a series of gear trains. When arm 82 is pushed into the sheath, L-shaped link 88 is swung around pivot pin 96 by the force transmitted from arm 82 through links 84 and 86 around pivot pin 90.

Figure 2:
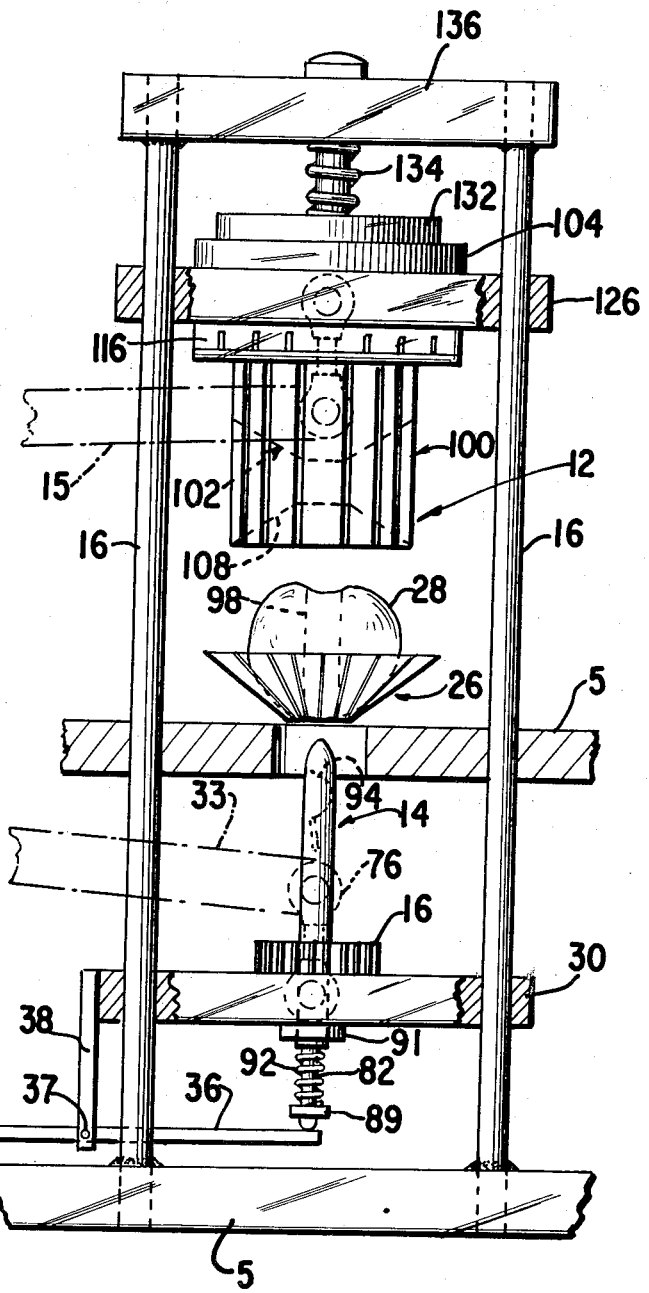
FIG. 2 shows the combination of the orienting cup holding an apple; a slicer assembly, which includes a slicer knife cluster and a free floating weight disposed above the cup; and a celling knife positioned below the apple which is adapted to be projected into the core cavity of the apple.

In FIG. 2, apple 28 is disposed on orienting cup 26 between the slicer assembly 12 and the celling knife 14. The slicer assembly includes free floating weight 100, as more specifically illustrated in FIG. 3, and slicer knife cluster 102, as more specifically illustrated in FIGS. 4 and 5. As shown in FIG. 3, the free floating weight 100 has a circular flange 104 and is itself a cylindrical structure which is provided with a plurality of evenly spaced slots 106. The lower extremity of the free-floating member is provided with a frusto-conical section 108 which is adapted to be seated on the apple when the slicer assembly is lowered. The weight of the member is important since it is set on top of the apple in order to prevent the apple from turning when the celling knife is extracting the seed cell material from the apple. When the weight of the free floating member is less than 7 pounds, the pressure against the apple is not sufficient to prevent it from turning during the seed celling operation. When the weight of the member is 15 pounds or more, soft apples are crushed in the orienting cup. It was found that when the weight of member 100, together with the flange 104, is about 11 pounds, the member is heavy enough to prevent the apple from turning but not so heavy as to crush the apple. The free-floating member 100 is preferably made from aluminum-bronze alloy since the alloy can be cast easily, is acceptable for use with foodstuffs and has sufficient tensile strength. Since aluminum-bronze is the preferred material for construction, and since the optimum weight for the member is about 11 pounds, the member shown in FIG. 3 has a cylindrical cavity 110 which reduces the weight of the member to the desired value and provides working space for the slicer knife cluster 102.

The slicer knife cluster 102, illustrated in FIGS. 4 and 5, includes a plurality of individual blades 114 all of which terminate with either a conical or frusto-conical section at the lower extremity. The configuration of each individual blade, shown in FIG. 5A, is in the form of a parallelogram, and preferably that of a rectangle, having a lug 114a with, the lower outer corner removed. The individual blades 114 fit into slotted bolt 118 and internally slotted ring 116. The individual blades are held in a cluster by means of nuts 120 and 124 provided on the extremities of bolt 118. Slots 142 extend only partially through the ring 116, as is evident from FIG. 4. Lugs 114a of knife blades 114 are disposed in the slots 142, in the manner best shown in FIGS. 4 and 5, and a clampring 144 is slipped about knife cluster 102 and against the bottom surface of the ring 116. Bolts 146 pass through openings in the ring between knife blades to secure the blades to the ring. The slicer knife cluster is fitted within the confines of free floating member 100 by aligning individual blades 114 with slots 106. The ring 116, which is just large enough to accommodate the circumference of the free floating member 100, is disposed about member 100.

Ring 116, having secured thereto individual knife blades 114, as shown in FIGS. 4 and 5, is affixed to frame plate 126 having a circular opening to accommodate the passage of the free floating member 100. The free floating member 100 rests on frame plate 126 by means of its flange 104 and extends through the aligned openings in frame plate 126 and ring 116. Flexible stop member 132 is secured to a stationary overhead frame 136 by means of spring 134. The stop member 132 is disposed directly above the flange 104 of the free floating member. The purpose of the stop member 132 is to flexibly restrain the travel of the free floating member 100 while allowing the slicer knife cluster to continue in its upward travel to remove the wedged apple slices from between the blades 114.

Two components of the celling and slicing machine, i.e., the slicer knife assembly and the celling knife, have been described above. Now follows the description of the machine itself.

The apples are oriented, peeled and cored in the manner described in Applicants' copending application Ser. No. 840,605 filed on July 7, 1969. Details of construction with respect to the orienting cups and the endless conveyor to which they are attached, disclosed in the copending application, have been omitted here for the purpose of presenting the essential features of the invention of this application in clear and concise form.

Only one orienting cup is shown in the drawings, although it should be understood that in a commercial embodiment, an endless conveyor having a plurality of the cups attached thereto, is entrained on a pair of sprockets which move the cups intermittently into position under the slicer assembly.

Referring to the drawings now, and to FIGS. 7 and 8 in particular, the celling and slicing machine includes frame members 5 supported by a stanchions 7. The slicer assembly 12 and celling knife 14 are slidably disposed on posts 16 which are secured to the frame in any convenient fashion.

Cam 10 is positioned on drive shaft 19 which is driven by any suitable motor. Cam 10 is provided with cam tracks 11a and 12a on each side thereof. Cam follower 11, which runs in cam track 11a, is affixed to link 13 and effects movement of the slicer assembly 12 through links 14 and 15. Links 13 and 15 are pivotally mounted on rods, generally designated by numeral 66. Link 14 connects the end of link 13 to link 15 at a point intermediate the ends of link 15. Pins 68 and 70 interconnect links 13, 14 and 15. The other end of link 15 is affixed to the frame plate 126 of the slicer assembly which is slidably disposed on guide posts 16. The connection between link 15 and the frame plate 126 is through bolt 64, which is threaded at both ends to permit adjustment.

In reference to FIGS. 7 and 8, the link assembly manipulated by cam follower 12 functions to raise and lower the celling knife 14. This latter link assembly includes links 31, 32 and 33. One end of links 31 and 33 is pivotally mounted on rods 66. Pins 72 and 74 interconnect the other end of link 31 to link 33 through link 32. The other end of link 33 is connected to the celling knife by a fully threaded bolt 76, which permits adjustment. The celling knife 14 rests on support frame 30 which is slidably disposed on guide posts 16.

When the celling knife is raised into the core cavity of the apple by the linkage assembly 31, 32 and 33, roller 40 comes into contact with cam 42. Roller 40 is mounted on link 36 which is suspended by means of link 38 fixed to support plate 30. The opposite end of link 36 is in contact with arm 82 of the celling knife. As roller 40 rides cam 42, link 36 is pivoted around fulcrum pin 37 to either raise or lower arm 82 of the celling knife. The raising of arm 82 against biasing spring 92 functions to gradually move knife 94 out of sheath 78 and into contact with the interior of the apple. As the celling knife is being gradually expanded, it is also being simultaneously rotated. This rotation is derived from drive shaft 19. As is better illustrated in FIG. 8, sprocket gear 46 is mounted on drive shaft 19 while sprocket gear 44 is mounted on a parallel shaft 21. Rotational motion is imparted to shaft 21 by means of chain or belt 48 entrained about sprocket gears 44, 46. Bevel gear 50, mounted on shaft 21, imparts rotation to shaft 22, shown in FIG. 7, through beveled gear 52. Affixed on shaft 22 above beveled gear 52 is the first gear 64 of a gear train which includes gears 58, 60 and 62. Gear 58, which is mounted on square shaft 17, imparts rotation to the gear train which includes gears 54 and 16. Gear 16 imparts rotation to the celling knife by virtue of being affixed thereto. As best seen in FIG. 8, the celling knife and gears 56, 54 and 16 all rest on support plate 30. Gear 56 slides up and down on the square shaft 17 to maintain engagement with gear 54 at all times as support plate 30 is raised and lowered.

The sequence of operation is shown in FIGS. 9, 10, 11 and 12. FIG. 9 shows position of the slicer assembly and the celling knife at the point when the apple in the orienting cup is moved into position for celling and slicing. After the apple has been properly positioned, the cam 10 is rotated to lower the frame plate 126 and to raise support member 30 to the position shown in FIG. 10. In this position, the weight of the free floating member 100 rests fully on the apple while the celling knife, which is disposed within the core of the apple, is rotated and expanded with the result that the knife blade 94 is gradually moved out of sheath 78 into contact with the apple to remove the seed cell material.

After the seed cell material has been removed, the celling knife is collapsed and retracted from within the core of the apple and the frame plate 126 is moved downwardly carrying with it the slicer knife cluster. As frame plate 126 is advanced downwardly, blades 114 come in contact with the apple and sever it into individual slices, as shown in FIG. 11. THe contour of terminal portion of the slicer knife cluster is designed to generally conform with interior of the orienting cup. To insure that the slices are completely severed from the apple, the orienting cups are provided with a plurality of grooves 112, as shown in FIG. 6, to complement the blades of the slicer knife cluster. Therefore, when the apple is sliced, the individual blades pass through the apple and into the grooves to assure that the slices are completely detached from the apple. Since upon elevation of the knife cluster away from the apple, the wedged apple slices have a tendency to also raise the free floating member, flexible stop member 132 functions to flexibly restrain upward movement of the free floating member by application of the pressure in spring 134. It is due to this arrangement that all of the apple slices are left neatly disposed in the orienting cup and none are carried upwardly with the knife cluster or spilled over the cup.

We claim:

1. An apparatus for slicing fruit, such as apples, comprising slicing means; means for raising and lowering said slicing means; a free floating member freely disposed on said slicing means; and an apertured receptacle disposed beneath said slicing means; said aperture serving to permit entrance of a cutting means into the core cavity of the fruit disposed in said receptacle for removing the seed cell material from within the fruit, said free floating member being adapted to freely rest on the fruit when said cutting means is moved into the core cavity of the fruit and being of sufficient weight to prevent any movement of the fruit while the seed cell material is being extracted, said slicing means being adapted to slice the fruit into a plurality of slices following the extraction of the seed cell material therefrom.

2. Apparatus of claim 1 wherein said free floating member is a cylindrical structure provided with a plurality of slots extending axially and into the interior of said cylindrical structure and having a frusto-conical interior at its lower extremity to complement the shape of the upper portion of the fruit on which it rests during a sequence of operation of the apparatus; and wherein said slicing means includes a plurality of blades which extend radially from a central point, said slicing means being disposed within said free floating member with said blades being positioned in said slots.

3. Apparatus of claim 2 wherein said slicing means includes a bolt having axially extending grooves; a ring member provided with grooves on the inner surface thereof, said ring member being disposed about said free floating member; said blades fitting into the grooves in said bolt and into the grooves in said ring member; and means for rigidly securing said blades to said ring member and said bolt.

4. Apparatus of claim 3 wherein each of said blades has a parallelogram configuration, including a lug, with the outer lower corner removed, said lug serving to secure the blade to the ring member.

5. Apparatus of claim 4 wherein said receptacle has an inverted frusto-conical form to generally complement the configuration presented by said blades, said receptacle being provided with grooves aligned with each of said blades to assure efficient slicing of the fruit disposed in the receptacle when the blades pass through the fruit and come to rest in said grooves.

6. Apparatus of claim 5 including a frame member provided with an opening; said free floating member, which includes a flange at its upper extremity, being disposed through the opening in said frame member and freely resting on said frame member; said slicing means being attached to said frame member.

7. Apparatus of claim 6 including a flexible stop means mounted above said free floating member to restrain the upward movement of said free floating member when said slicing means is retracted after slicing the fruit.

8. Apparatus of claim 7 including a conveyor means, a plurality of centrally apertured receptacles mounted on said conveyor means, and means for intermittently advancing said conveyor means to a position directly under said slicing means.

9. Apparatus of claim 1 including cutting means for removing the seed cell material disposed below said receptacle and means for raising and lowering said cutting means into and out of the core cavity of the fruit disposed in said receptacle.

10. Apparatus of claim 9 including means for rotating said cutting means when it is disposed in the core cavity of the fruit, and means for gradually expanding said cutting means to remove the seed cell material from the fruit in sufficiently fine particles to be screened out in a conventional manner for discarding undesirable small pieces of the fruit.

11. Apparatus of claim 10 wherein said means for raising and lowering said cutting means and said means for raising and lowering said slicing means include a coordinate means for synchronizing operation of the respective means.

12. Method for slicing and celling fruit, such as apples, having a core cavity extending therethrough, comprising positioning the fruit disposed in an apertured receptacle above a celling knife and below a slicer assembly which includes a slicing means and a free floating member, the core of the fruit being axially aligned with the aperture in the receptacle; advancing the free floating member against the fruit so that the free floating member rests freely on the fruit while simultaneously elevating the celling knife into the core cavity of the fruit; rotating the celling knife while simultaneously gradually expanding the knife to remove the seed cell material from the fruit in sufficiently fine particles to be screened out in a conventional manner for discarding undesirable small pieces of the fruit, the weight of the free floating member being sufficient to prevent the fruit from turning; collapsing the knife and retracting it out of the core cavity of the fruit; advancing the slicing means against and into the fruit to divide the fruit into slices; elevating the slicing means while flexibly restraining the upward movement of the free floating member in order to remove slices of the fruit which have become wedged in the slicing means; and raising the free floating member off the fruit.

13. Method of claim 12 wherein said fruit is apples.

14. Method of claim 13 including the step of intermittently moving apples disposed in a plurality of cups forming a conveyor into position under the slicer assembly and above the celling knife.

* * * * *